W. V. TURNER.
EMPTY AND LOAD BRAKE.
APPLICATION FILED OCT. 1, 1914.

1,265,001.

Patented May 7, 1918.
6 SHEETS—SHEET 3.

WITNESSES
H. W. Crowell
G. M. Clements

INVENTOR
Walter V. Turner
by Wm. M. Cady
Att'y.

W. V. TURNER.
EMPTY AND LOAD BRAKE.
APPLICATION FILED OCT. 1, 1914.

1,265,001.

Patented May 7, 1918.
6 SHEETS—SHEET 4.

WITNESSES
H. W. Crowell
G. M. Smuts

INVENTOR
Walter V. Turner
by Wm. M. Cady
Att'y

W. V. TURNER.
EMPTY AND LOAD BRAKE.
APPLICATION FILED OCT. 1, 1914.

1,265,001.

Patented May 7, 1918.
6 SHEETS—SHEET 5.

WITNESSES
H. W. Crowell
G. W. Clements

INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMPTY AND LOAD BRAKE.

1,265,001.  Specification of Letters Patent.  Patented May 7, 1918.

Application filed October 1, 1914. Serial No. 864,433.

*To all whom it may concern:*

Be it known that I, WALTER V. TURNER, a citizen of the United States, residing at Edgewood, in the county of Allegheny and State of Pennsylvania, have invented new and useful Improvements in Empty and Load Brakes, of which the following is a specification.

This invention relates to fluid pressure brakes, and more particularly to a brake apparatus adapted to vary the braking power according to the load on the car.

One object of my invention is to provide a load regulated brake in which the braking power is adjusted to correspond with the load by varying the reservoir volume from which fluid is supplied to apply the brakes.

Another object of my invention is to provide improved means for preventing adjustment of the load regulating mechanism when the car is running.

Another object of my invention is to provide a load adjusted device and a load brake mechanism adapted to be controlled by said device with the application of a minimum degree of force.

Other objects and advantages will appear in the following more detailed description of the invention.

In the accompanying drawings.

Figure 1:
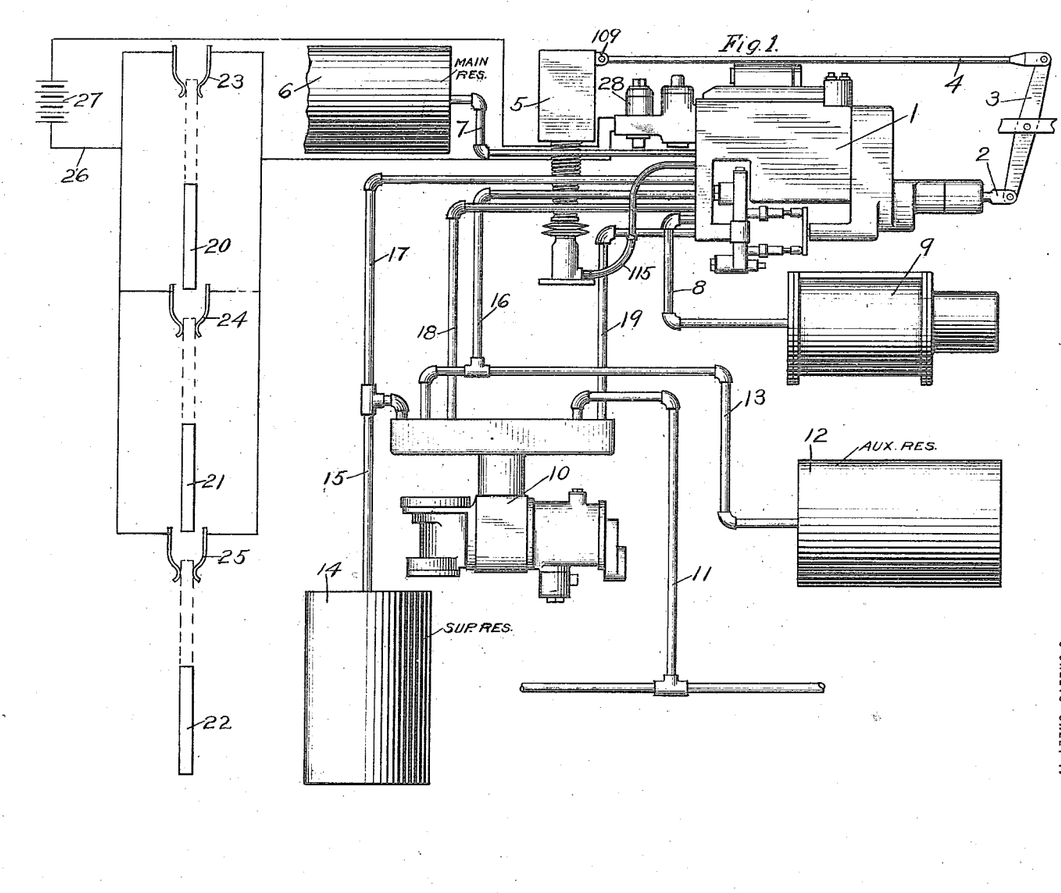
Figure 1 is a diagrammatic view of a load regulated car air brake equipment with my invention embodied therein.

An equipment embodying my invention is shown diagrammatically in Fig. 1 of the drawings and comprises generally a load brake controlling valve mechanism 1 having an adjusting rod 2 connected by a pivoted lever 3 to a rod 4 which in turn is connected to a device 5 for adjusting the load brake mechanism 1 according to the load on the car.

Preferably the main reservoir 6 is connected by pipe 7 to the load brake mechanism 1 and pipe 8 connects the brake cylinder 9 thereto. A valve mechanism 10 controls the application and release of the brakes according to variations in pressure in the brake pipe 11. Connected to said valve mechanism are the auxiliary reservoir 12 through through pipe 13 and the supplemental reservoir 14, through pipe 15. The auxiliary reservoir 12 is also connected to the load brake mechanism 1 by branch pipe 16 and the supplemental reservoir 14 through pipe 17. Pipe 18 is a service application and release pipe and pipe 19 the emergency application pipe. Car doors 20, 21, and 22 are adapted in open position, as shown in dotted lines, to close the respective electric switches 23, 24, and 25 arranged in parallel in a circuit wire 26 including a source of current 27 and a magnet 28 attached to the load brake mechanism 1.

Figure 2:
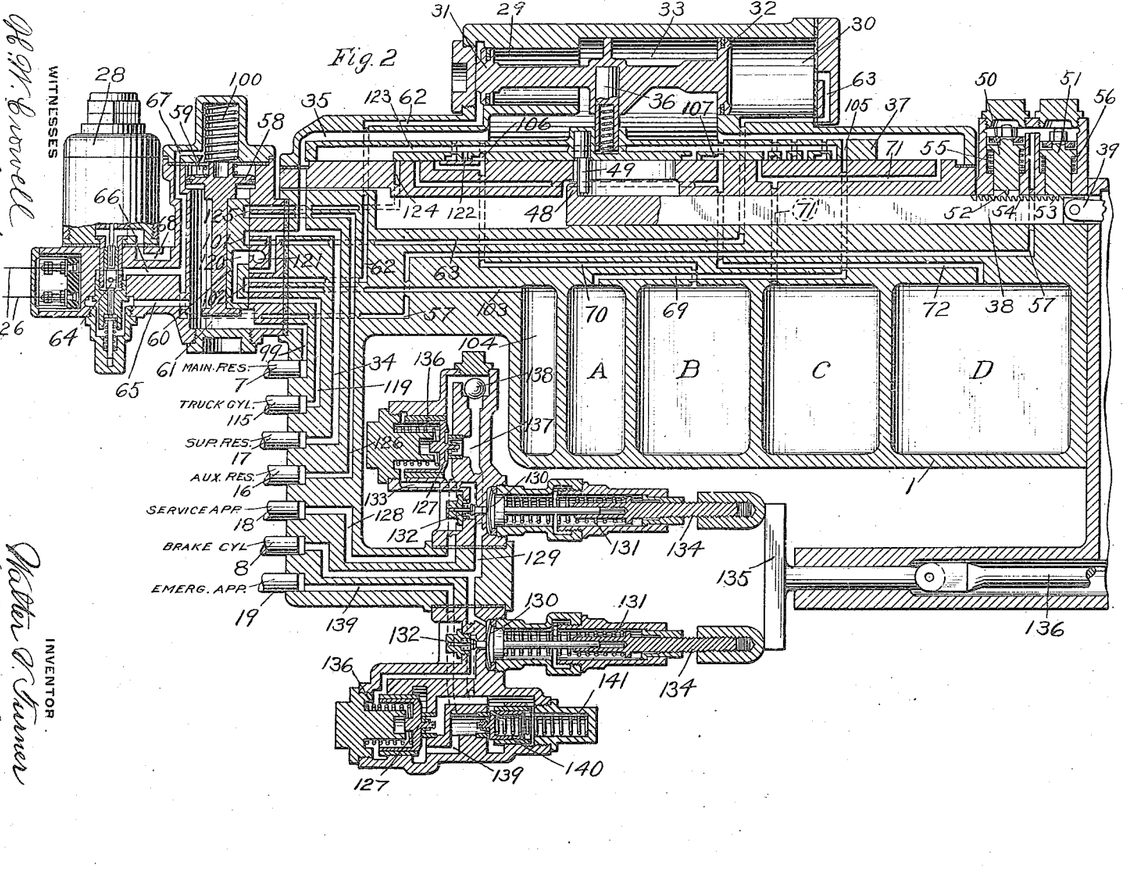
Fig. 2 a diagrammatic central sectional view of the load brake valve mechanism, showing the parts in position when the car is light.

As shown in Fig. 2 of the drawings, the load brake mechanism 1 may comprise a casing having a piston chamber 29 and a larger piston chamber 30 within which work the respective piston heads 31 and 32 of a differential piston device. The space 33 intermediate said piston heads is constantly connected to the supplemental reservoir 14 through pipe 17 and passages 34 and 35. The differential piston carries a stem 36 for operating a slide valve 37 adapted to control communication between the auxiliary reservoir 12 and a series of chambers A, B, C, and D.

The operating position of the slide valve 37 is determined by the position of a slide rod 38 which is connected through a link 39 with a pivoted lever 40 having an arm 41 provided with a roller 42 adapted to be engaged by the curved end of a block 43 attached to the end of rod 2. Springs 44 and 45 act on the block 43 in a direction tending to maintain the same in its inner position.

Guide rollers 46 and 47 may be provided for directing and facilitating the horizontal movement of the block 43.

The inner end of the slide rod 38 is provided with a vertical flange or abutment 48 adapted to engage a pin 49, carried by and extending downwardly from slide valve 37, the slide valve seat being slotted to provide for the movement of the pin and flange.

For locking the slide rod 38 in its adjusted position, preferably two ratchet pawl devices are employed comprising pistons 50 and 51 carrying the respective pawls 52 and 53 adapted to engage teeth 54 on the outer end of the slide rod 38.

Springs 55 and 56 tend to maintain the respective pistons 50 and 51 with the pawls 52 and 53 out of engagement with the teeth 54 and said pistons are adapted to be operated by fluid under pressure supplied thereto through passage 57 when the magnet 28 is deënergized.

In order to operate the differential piston device, a valve device is provided comprising a piston 58 contained in piston chamber 59 and a slide valve 60 adapted to be operated by said piston and contained in valve chamber 61, the slide valve 60 controlling passages 62 and 63 leading respectively to the piston chambers 29 and 30 of the differential piston device.

The magnet 28, which is controlled by the opening and closing of the car doors, is adapted to operate a double beat valve 64 which in one position connects passage 65 leading from valve chamber 61 with a passage 66 connected to passage 57 and also passage 67, leading to piston chamber 59. In the other position of the valve 64, the passage 66 is connected to an atmospheric exhaust port 68.

The chambers A, B, C, and D have respective passages 69, 70, 71, and 72 leading to the seat of slide valve 37 and provision is made for charging said chambers from the supplemental reservoir 14 and maintaining same charged in all positions of the slide valve 37, except when a chamber is connected to the auxiliary reservoir.

Figure 5:
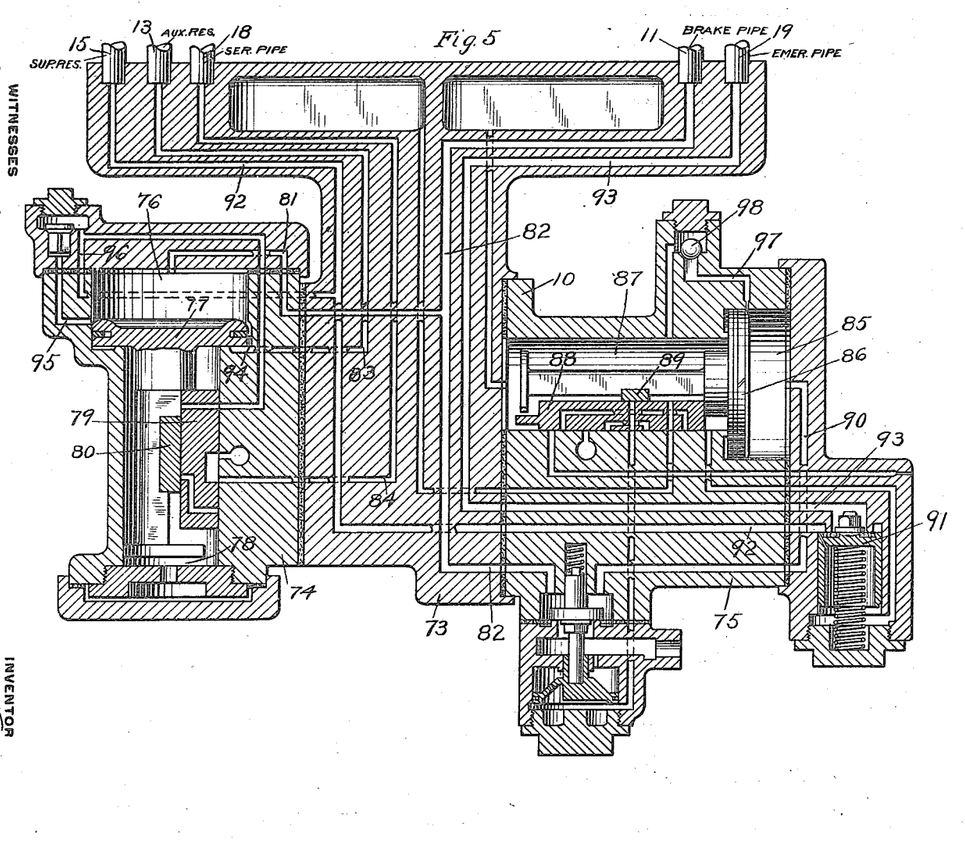
Fig. 5 a central sectional view of the brake application and release valve device, with the parts in normal release position.

While various forms of brake application and release valve devices may be employed in connection with the load brake apparatus, a desirable construction is shown in Fig. 5 of the drawings and comprises a pipe bracket section 73, an equalizing valve portion 74, and an emergency valve portion 75.

The equalizing valve portion has a piston chamber 76 containing piston 77 and a valve chamber 78 containing a main slide valve 79 and a graduating slide valve 80 mounted on the main slide valve and having a movement relative thereto. The piston chamber 76 is connected by passages 81 and 82 to brake pipe 11 and valve chamber 78 is connected to the auxiliary reservoir 12 through passage 83.

Service and release passage 84 leads from the seat of the slide valve 79 and communicates with pipe 18.

The emergency valve portion has a piston chamber 85 containing piston 86 and valve chamber 87 containing slide valve 88 and auxiliary valve 89, the piston chamber 85 being connected to the brake pipe through passages 90 and 82.

A valve piston 91 controls communication from a passage 92 leading to the supplemental reservoir pipe 15, to passage 93 which leads to the emergency pipe 19.

Figure 6:
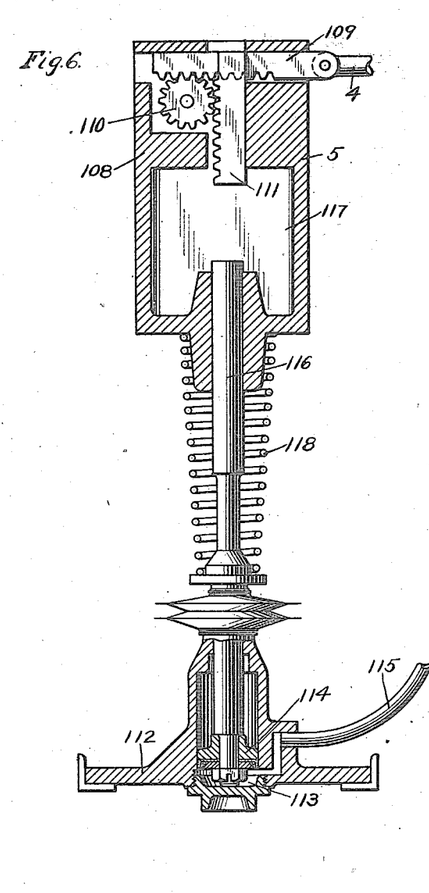
Fig. 6 a central sectional view of the device for adjusting the load brake mechanism according to the load on the car, showing the parts in normal position when the car is running.

The device 5 for adjusting the load brake mechanism according to the load on the car may comprise a casing 108 secured to the car body and having a horizontal recess containing a rack bar 109 pivotally secured to the end of rod 4. The teeth of the rack bar 109 engage the teeth of a pinion 110 pivotally mounted within the casing 108 and a vertical rack bar 111 is provided with teeth for also engaging the teeth of the pinion 110.

Attached to the spring plank of the truck is a casting 112 having a piston chamber 113 containing a piston 114 and having a pipe 115 leading to the load brake mechanism 1. The piston 114 is provided with a vertical plunger 116 adapted to extend through a guide bearing in the casing 108 and into a chamber 117 therein, a coil spring 118 tending to maintain the plunger 116 and piston 114 at the lower position as shown in Fig. 6.

Figure 7:
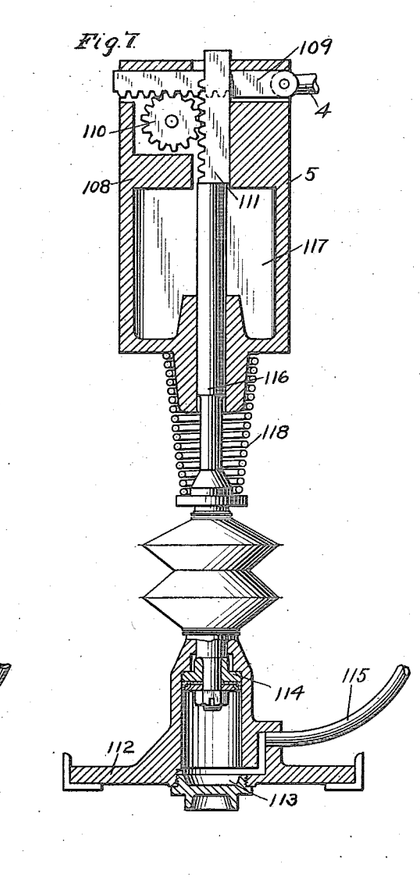
Fig. 7 a view similar to Fig. 6, but showing the parts in position assumed when a load is applied to the car, with the car standing.

When fluid is admitted to piston chamber 113 through pipe 115, the piston 114 is shifted to its upper position so as to engage the end of the vertical rack bar 111, and if a load be now applied to the car, the casing 108 will be moved downwardly by the compression of the car springs so that the plunger 116 will act as an abutment for the vertical rack 111 and thereby cause said rack to move and rotate the pinion 110. The rotation of the pinion then causes a horizontal movement of the rack bar 109, which movement is transmitted through the rod 4 and lever 3 to the load brake mechanism 1.

In operation, the auxiliary reservoir 14 is charged with fluid under pressure by flow from the brake pipe to piston chamber 76 of the brake application and release valve device and thence through the usual feed groove 94 to valve chamber 78 which is in communication with passage 83. The supplemental reservoir is charged through passages 95, 96, and 92 and emergency valve chamber 87 is charged from the brake pipe through passage 97 containing a ball check valve 98. Fluid from the supplemental reservoir 14 flows through pipes 15 and 17 and passages 34 and 35 to the intermediate chamber 33 of the differential piston contained in the load brake mechanism.

Assuming magnet 28 deënergized, the double beat valve 64 will be in the position shown in Fig. 2 and fluid from the main reservoir flowing through passage 99 to valve chamber 61 will also flow through passages 65, 66, and 67 to piston chamber 59, thus balancing the fluid pressures on piston 58 so that spring 100 operates to shift the piston and slide valve 60 to the inner position, in which passage 63 leading to piston chamber 30 is connected by cavity 101 with supplemental reservoir passage 34, and passage 62 leading to piston chamber 29 is connected by cavity 102 with a passage 103 leading to a chamber 104. Supplemental reservoir pressure in piston chamber 30 consequently operates to shift the differential piston to the position shown in Fig. 2, assuming that there is no load on the car.

With the magnet 28 deënergized, fluid also flows from the main reservoir through passage 57 to the piston chambers of the locking pistons 50 and 51, so that the locking pawls 52 and 53 are pressed against the slide bar 38.

The chambers A, B, and D are charged from the supplemental reservoir in the light position of the slide valve 37 through the registration of the respective passages 69, 70 and 72 with the respective ports 105, 106, and 107, the passage 71 of chamber C being open directly to the valve chamber of slide valve 37.

According to the construction shown in Fig. 2 of the drawings, there are provided 9 regulating positions as follows; in position one, only the auxiliary reservoir 14 is connected in for supplying fluid to the brake cylinder. In position two, the movement of slide valve 37 connects the chamber A to the auxiliary reservoir, in position three chamber B is connected, position four, chamber D, position five, chambers A and D, position six, chambers B and D, position seven, chambers A, B, and D, position eight, chambers B, C, and D, and in position nine, chambers A, B, C, and D. The chambers A, B, C, and D are of different volumes and by the various combinations above enumerated, the volume of the auxiliary reservoir can be varied by small amounts with the use of few chambers, for example, in the particular arrangement shown, eight different auxiliary reservoir volumes are obtained with the use of only four chambers.

In the position shown in Fig. 2, the truck cylinder piston chamber 113 of the device 5 is open to the atmosphere through pipe 115, passage 119, cavity 120 in slide valve 60 and exhaust port 121.

Figure 3:
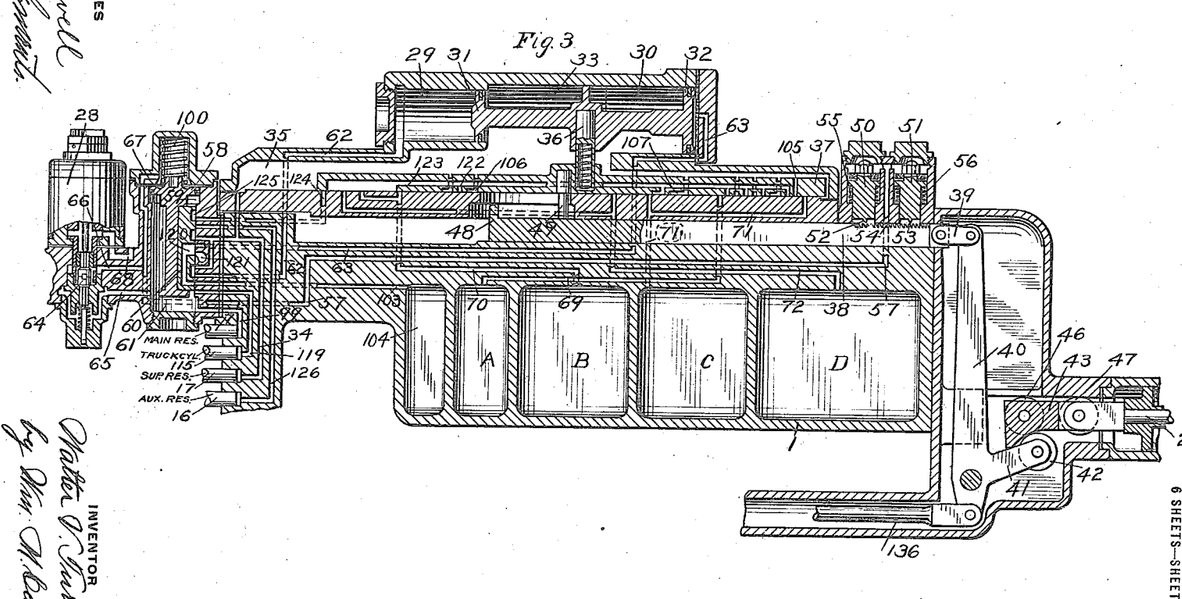
Fig. 3 a section similar to that of Fig. 2, but having a portion of the valve mechanism broken away, showing the parts in position when the car doors are opened and the car is standing still.

When any one of the car doors is opened, the circuit through wire 26 is closed, so that magnet 28 is energized and the double beat valve 64 is thereby actuated. The main reservoir supply passage 65 is thus closed, while the passage 66 is connected to exhaust port 68. Fluid is thereupon vented from piston chamber 59 and piston 58 then moves the slide valve 60 to the position shown in Fig. 3 of the drawings. In this position, passage 63 is connected by cavity 120 with exhaust port 121, while passage 62 is connected to the supplemental reservoir through cavity 102 and passage 34. The unbalancing of fluid pressures on the differential piston device then causes movement to the extreme right, as shown. In this position the chamber 104 is connected to the exhaust port 121 through cavity 120 and since fluid is vented from pistons 50 and 51 through passage 57, the pawls 52 and 53 are lifted by the action of the respective springs 55 and 56.

The parts remain in the above described positions, so long as any of the car doors are open and if the load on the car be increased at this time, the device 5 will operate as hereinbefore described, fluid under pressure having been admitted to the piston chamber 113 by the movement of slide valve 60 to the position shown in Fig. 2, in which the passage 119 is uncovered, so that fluid is supplied from valve chamber 61 and the main reservoir. The movement of the rod 4 operates through lever 3 to pull out the rod 2 and thereby cause the curved face of the block 43 to act on roller 42.

Figure 4:
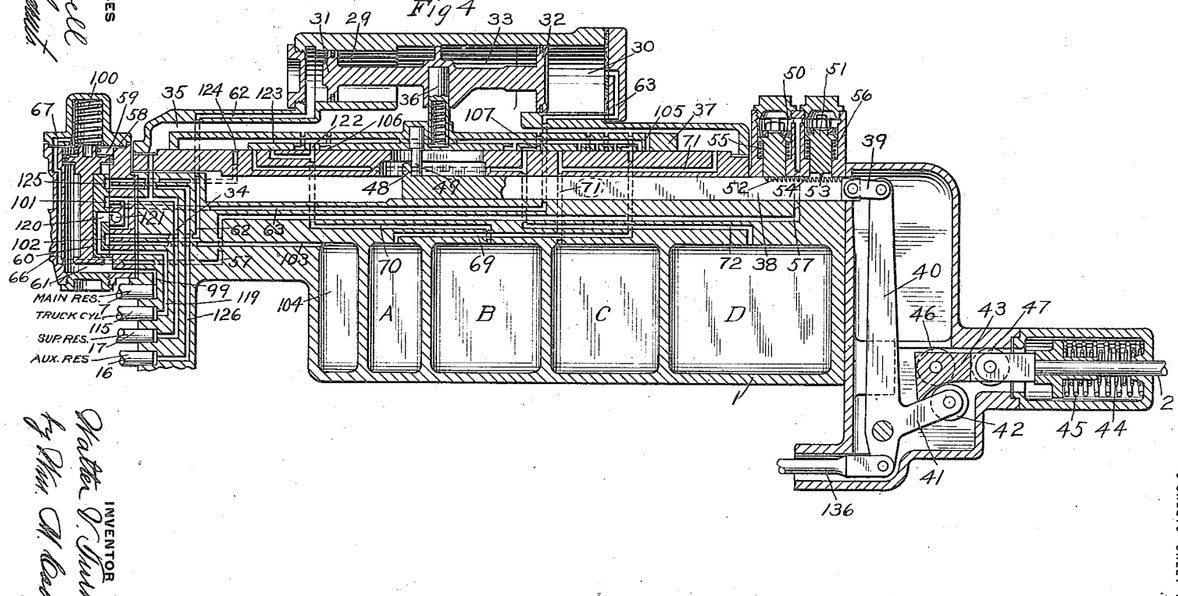
Fig. 4 a section similar to that of Fig. 3, showing the parts in one of the load adjusted positions.

The arm 41 is thus depressed a certain amount dependent upon the load applied to the car and the corresponding movement of the block 43, and the lever 40 thereupon shifts the slide bar 38 to the right, as for example, to the position shown in Fig. 4 of the drawings.

When the last car door is closed, all the switches controlled by the car doors will be opened, so that the circuit through wire 26 is opened and the magnet 28 is deënergized. The double beat valve is thereupon moved by its spring to close the exhaust passage 68 and open communication so that fluid under pressure is supplied to the locking pistons 50 and 51. One of the pawls 52 or 53 will then engage with the teeth 54 of the slide bar 38 and lock the same against movement. The two locking pawls are arranged so that either one or the other will be in position to drop into a tooth depression of the slide bar 38, thus insuring the accurate and positive adjustment of same.

Assuming that the load on the car and the consequent depression of the car body is sufficient to shift the slide bar 38 to the position shown in Fig. 4, the movement of the slide valve 60 to normal position operates to connect the small piston chamber 29 with chamber 104 which is now at atmospheric pressure and the large piston chamber 30 with the supplemental reservoir. The unbalancing of fluid pressures thus produced on the differential piston device operates to shift same to the left until the pin 49 is brought into engagement with the flange 48, as shown in Fig. 4.

In this particular load position, passage 70 registers with port 122 which opens into an extended cavity 123 in the slide valve 37, and since this cavity is open to the auxiliary reservoir through passage 124, cavity 125, and passage 126, the chamber B now forms part of the auxiliary reservoir 12.

If the brakes are now applied in service by the operation of the brake application and release valve mechanism shown in Fig. 5 of the drawings, the equalizing piston and slide valve operate to supply fluid from the enlarged auxiliary reservoir to the brake cylinder.

By thus augmenting the auxiliary reservoir volume, the brake cylinder pressure will be correspondingly increased for any given reduction in brake pipe pressure over that obtained for the same reduction on a light car where only the original auxiliary reservoir volume is employed. In a similar manner, for other loads, the slide bar 38 will be shifted to act as a stop for the slide valve 37 to hold the same in some one of the several load positions hereinbefore enumerated, as will be evident.

According to my invention, the brake apparatus for a car is preferably designed so that with the total auxiliary reservoir volume cut in, assuming seventy pounds as the standard brake pipe pressure, the auxiliary reservoir, brake cylinder, and brake pipe will equalize at fifty pounds and produce the desired maximum per cent. braking power and in order to obtain the desired lower equalization pressure on a light car, for example, say thirty-five pounds, when the brake pipe pressure is reduced to fifty pounds, it is necessary to limit the auxiliary reservoir to such volume that when thirty-five pounds is obtained in the brake cylinder, the auxiliary reservoir and the brake pipe pressures will be equalized at fifty pounds.

It will be seen that if the above conditions obtain, then a further reduction in brake pipe pressure below the equalizing point will cause an increase in brake cylinder pressure above the desired degree on a light car. This will also be true in the load positions up to the last position where the relative volumes are such that the usual equalization at fifty pounds is obtained. It is desirable to limit the maximum pressure obtainable on a light car to the predetermined degree, such as thirty five pounds, in the example considered, and also to corresponding maximum degrees in the load positions. For this purpose, a limiting valve device is provided for cutting off further supply of fluid to the brake cylinder when the maximum desired degree is reached, the device being automatically adjusted to vary this maximum degree according to the load on the car.

As shown in Fig. 2 of the drawings, the limiting valve device may comprise a valve piston 127 for controlling communication from passage 128 through which fluid is supplied from the brake application and release valve mechanism to the brake cylinder, to a passage 129 which leads to the brake cylinder pipe 8. A diaphragm 130 subject on one side to the pressure of an adjustable regulating spring 131 and on the opposite side to brake cylinder pressure operates a valve 132 for controlling communication from the spring chamber of the valve piston 127 by way of passage 133 to brake cylinder passage 129.

For automatically adjusting the limiting valve according to the load on the car, a plunger 134 acting on spring 131 is provided and the outer end of the plunger engages a crosshead 135 pivotally connected to a link 136 which is in turn pivotally connected to the end of lever 40.

When the lever 40 is actuated by the load on the car, the crosshead 135 moves the plunger 134 to the left and compresses the spring 131 a certain amount in addition to the initial compression of the spring provided for light cars.

In making an application of the brakes, fluid flows from the application and release valve device through pipe 18 and passage 128 to the face of the valve piston 127, lifting the same from its seat, so that fluid continues its flow to the brake cylinder passage 129.

When the brake cylinder pressure, acting on the diaphragm 130, slightly exceeds the resistance of the spring 131, the diaphragm moves so as to permit the valve 132 to seat. Fluid pressures on opposite sides of the valve piston 127 then equalize, permitting the spring 136 to move the valve piston to its seat, thus cutting off further flow of fluid to the brake cylinder. It will thus be seen that the limiting valve prevents the brake cylinder pressure from exceeding the desired predetermined maximum degree which varies according to the load on the car.

In order to insure the release of the brakes, a release passage 137 is provided which contains a ball check valve 138 for preventing back flow, so that in releasing the brakes, fluid can flow from the brake cylinder, through passage 137 past check valve 138 to the passage 128.

A higher maximum pressure may be permitted in an emergency application of the brakes, and in order to provide for this, an additional limiting valve device substantially the same as that employed in service may be provided, the spring 131, however, being adjusted to the desired higher maximum degree of pressure.

In making an emergency application of the brakes, fluid flows from the application and release valve mechanism through a separate emergency pipe 19 which communicates with a passage 139 leading to the valve piston 127. The operation in emergency is the same as in service, the brake cylinder pressure in passage 129 acting on the emergency diaphragm 130, so that when the brake cylinder pressure in emergency exceeds the maximum degree for which the emergency limiting spring 131 is adjusted, further supply of fluid to the brake cylinder is shut off.

In order to provide against the possible contingency of the limiting valve device becoming inoperative by the breakage of the limiting valve spring 131 or otherwise, an excess pressure valve device may be provided which is adapted to permit flow of fluid to the brake cylinder up to a certain predetermined degree less than the pressure of fluid supplied from the source of pressure. For this purpose a valve piston 140 is employed which is subject on one side to the pressure of a spring 141 and on the opposite side to the pressure of fluid flowing in the supply passage 139.

If the valve piston 127 fails to open, then when the pressure of fluid supplied in an emergency application to the passage 139 exceeds the resistance of the spring 141, the valve piston 140 will be lifted from its seat and fluid will flow to the brake cylinder passage 129, so that a brake application is insured in emergency.

It would be possible to have the slide valve 37 movable with and operative by the slide bar 38, but it has been found that this imposes a considerable back pressure against the adjusting device, producing an undue amount of strain in the mechanism and interfering with the sensitive action of the apparatus. For this reason I preferably employ an additional motor device, such as the differential fluid operated piston, for actuating the slide valve 37, so that the adjusting device is only required to shift an easily movable bar for merely defining the operating position of the slide valve.

Furthermore, since the movement of the car body relative to the truck when subjected to a load is small compared with the movement required of the slide bar 38, the leverage ratio must be high and this of course multiplies the power required to move the slide bar, so that the more easily the bar moves, the better.

While the compression of a spiral wound spring is substantially proportional to the load, the so-called elliptical spring compresses less and less as the load increases and in order to compensate for this and provide for a uniform movement of the slide valve 37 in direct proportion to the load, the curve of the block 43 against which the roller 42 acts is such that, as the block 43 moves out and the compressive movement of the elliptical spring decreases, the movement of the roller 42 relative to the block 43 is increased.

Where the car is equipped with ordinary coil springs, the compensating curve need not be employed.

Having now described my invention, what I claim as new and desire to secure by Letters Patent, is:—

1. In a load brake, the combination with an auxiliary reservoir from which fluid is supplied to effect an application of the brakes, of a plurality of normally charged chambers, a slide valve having positions for connecting one or more chambers to said auxiliary reservoir, a piston device operated by opposing fluid pressures for actuating said valve, and means controlled by the load on the car for defining the position of the slide valve and piston device.

2. In a load brake, the combination with an auxiliary reservoir from which fluid is supplied to effect an application of the brakes, of a plurality of normally charged chambers, a slide valve held to its seat by fluid under pressure and having positions for connecting one or more chambers to the auxiliary reservoir, a piston device having differential piston heads and movable in opposite directions by fluid under pressure for actuating said valve, and means controlled by the load on the car for determining the operating position of the slide valve and piston device.

3. In a fluid pressure load brake, the combination with an auxiliary reservoir and a supplemental reservoir, of a plurality of chambers normally maintained charged with fluid under pressure from the supplemental reservoir and means for connecting one or more of said chambers to the auxiliary reservoir according to the load applied to the car.

4. In a fluid pressure load brake, the combination with an auxiliary reservoir, of a plurality of normally charged chambers, a valve having positions for connecting one or more of said chambers to the auxiliary reservoir, and means controlled by the load on the car for defining the position of said valve, and a differential piston operated by fluid under pressure for actuating said valve.

5. In a fluid pressure load brake, the combination with an auxiliary reservoir and a supplemental reservoir, of a plurality of chambers, a valve for charging the chambers with fluid under pressure from the supplemental reservoir and having positions for connecting one or more of said chambers to the auxiliary reservoir, of means controlled by the load on the car for defining the position of said valve.

6. In a fluid pressure load brake, the combination with a reservoir from which fluid is supplied to effect an application of the brakes, of a plurality of chambers, a valve having positions for connecting one or more of said chambers to the reservoir, a piston device for actuating said valve, a stop device movable to different positions according to the load on the car, and means carried by said valve for engaging the stop device to determine the position of said valve.

7. In a fluid pressure load brake, the combination with a reservoir from which fluid is supplied to effect an application of the brakes, of a plurality of chambers, a valve having positions for connecting one or more of said chambers to the reservoir, a piston device for shifting the valve in one direction, and a stop device for limiting the movement of the valve in the opposite direction to one of its positions in accordance with the load on the car.

8. In a fluid pressure load brake, the combination with a reservoir from which fluid is supplied to effect an application of the brakes, of a plurality of chambers, a valve having positions for connecting one or more of said chambers to the reservoir, a projection carried by said valve, and a slide bar provided with an abutment adapted to act as a stop for said projection and operated according to the load on the car for thereby defining the position of said valve.

9. In a fluid pressure load brake, the combination with a reservoir from which fluid is supplied to effect an application of the brakes, of a plurality of chambers, a valve having positions for connecting one or more of said chambers to the reservoir, means governed by the load on the car for defining the position of said valve, and a locking device for maintaining said means in its adjusted position.

10. In a fluid pressure load brake, the combination with a member adapted to be adjusted to a position corresponding with the load on the car, a locking device for maintaining said member in its adjusted position, and electrically controlled means associated with the car doors for operating said locking device when the car doors are operated.

11. In a fluid pressure load brake, the combination with a member adapted to be adjusted to a position corresponding with the load on the car, a locking device for maintaining said member in its adjusted position, and electrically controlled means associated with the car doors for effecting the release of said locking device when one of the car doors is opened and for rendering said locking device operative when the car doors are closed.

12. In a fluid pressure load brake, the combination with a valve having positions for effecting variations in braking power, a piston device for actuating said valve, and means controlled by the load on the car for determining the position of said valve, of a valve device for varying the fluid pressure on said piston device to operate the same and an electro-magnet controlled valve for varying the fluid pressure on said valve device, the opening and closing of the circuit of the electro-magnet being controlled by the position of the car doors.

13. In a fluid pressure load brake, the combination with a reservoir, of a plurality of chambers and a valve having positions for connecting one or more of said chambers to the reservoir, to increase the volume of the reservoir by steps, the chambers being so connected with the reservoir that the number of stepped increases in reservoir volume exceed the number of chambers employed.

14. In a load brake, the combination with a valve having positions for varying the braking power according to the load on the car, of means controlled by the car doors for actuating said valve and mechanism controlled by the load on the car for defining the position of said valve.

15. In a fluid pressure load brake, the combination with a brake cylinder and mechanism for varying the braking power according to the load on the car, of a valve device for limiting the pressure of fluid supplied to the brake cylinder to a predetermined maximum and an excess pressure valve device for opening communication for supplying fluid to the brake cylinder when the pressure of fluid flowing to apply the brakes exceeds a predetermined degree.

16. In a fluid pressure load brake, the combination with mechanism carried by the car body for regulating the braking power according to the load on the car, of a device carried by the car truck for operating said mechanism and fluid pressure operated means for actuating said device to engage said mechanism.

17. In a fluid pressure load brake, the combination with mechanism carried by the car body for regulating the braking power, of a device carried by the truck for operating said mechanism according to the load on the car, a piston operated by fluid under pressure for moving said device into operative engagement with said mechanism, and means controlled by the car doors for supplying fluid to said piston.

18. In a fluid pressure load brake, the combination with mechanism carried by the car body for regulating the braking power, of a device carried by the truck for operating said mechanism according to the load on the car, a piston operated by fluid under pressure for moving said device into operative engagement with said mechanism, and electrically controlled means operated according to the position of the car doors for supplying fluid to operate said piston.

19. In a fluid pressure load brake, the combination with a brake pipe, reservoir, brake cylinder, and an automatic valve device operated upon a reduction in brake pipe pressure for supplying fluid from the reservoir to the brake cylinder, of a plurality of chambers normally charged with fluid under pressure, the combined volumes of said chambers and said reservoir being equal to the volume of the ordinary standard auxiliary reservoir, and means operated according as the load on the car is decreased for cutting one or more of said chambers out of connection with said reservoir.

20. In a fluid pressure load brake, the combination with a mechanism for regulating the braking power and an adjusting device operated according to the load on the car for controlling said mechanism, of means for transmitting movement from said device to said mechanism and arranged to compensate for variations in the compressive movement of the car springs.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."